Jan. 11, 1966   M. DANGAUTHIER   3,228,255
MOTOR-CHANGE GEAR UNITS
Filed Jan. 10, 1963

INVENTOR:
MARCEL DANGAUTHIER
BY: LeBlanc & Shur
ATTORNEYS

United States Patent Office 3,228,255
Patented Jan. 11, 1966

1

3,228,255
MOTOR-CHANGE GEAR UNITS
Marcel Dangauthier, Paris, France, assignor to Societe d'Etudes et d'Applications Industrielles Commerciales et Immobilieres "Inter-Technique," Paris, France, a French body corporate
Filed Jan. 10, 1963, Ser. No. 250,518
Claims priority, application France, Feb. 8, 1962, 887,433, Patent 1,321,569
2 Claims. (Cl. 74—333)

The invention relates to motor-change gear units in which the shafts of the gearbox are parallel with the axis of the crankshaft of the motor.

In these devices it is known to locate the clutch at one end of the crankshaft of the motor so as to facilitate access thereto, the driving element of the clutch being keyed on the end of the crankshaft and the driven element being rigid with a gear driving a gear mounted on the input shaft of the gearbox. The usual pulley for driving the accessories (for example the dynamo and fan) is in this case keyed on the opposite end of the crankshaft. It will be understood that this arrangement necessitates locating an oil-sealed bearing in the walls of the case at both ends of the crankshaft.

The applicant has discovered that the aforementioned arrangement of the motor and gearbox conveniently lends itself to the elimination of an oil-sealed bearing.

According to the invention, the drive pulley driving the accessories is rigid with the end of the crankshaft corresponding to the clutch end thereof, whereas the opposite end of the crankshaft is supported by a bearing which is located within the case and consequently does not require to be oil-sealed.

Figure 1:
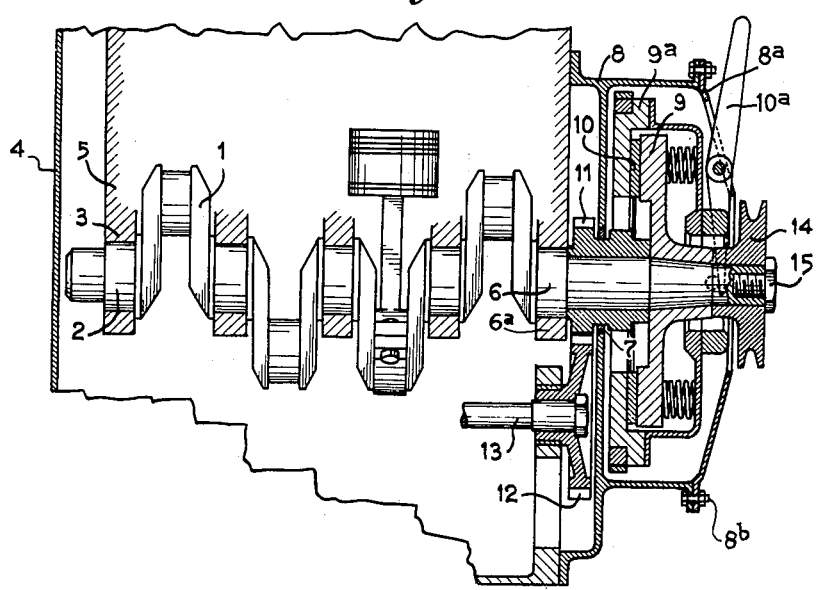
Figure 2:
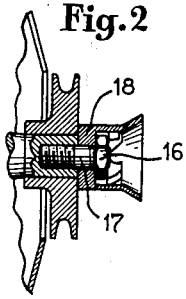

In the accompanying drawing:

FIG. 1 shows by way of example in vertical section an arrangement of this type, and FIG. 2 is a section of a detail according to a modification of the invention.

In this drawing, the reference numeral 1 designates the motor crankshaft having an end journal 2 mounted in a bearing 3 disposed within the case 4, for example in a web or boss 5. This bearing 3 does not need to be oil-sealed.

Toward its opposite end, the crankshaft comprises a journal 6 mounted in a bearing 6a carried by a web or boss of the case.

The clutch case 8 is detachably secured to the case 4 of the engine and contains: the driving element of the clutch, which comprises two parts (a fixed part 9 solid with the end of the crankshaft 1 and a mobile part 9a) and a driven element of the clutch gripped between the parts 9 and 9a, rotatively connected with the pinion 11 to rotate therewith, but axially on this pinion. This pinion 11 is driven element 10 of the clutch freely rotative on the crankshaft and is in mesh with the gear 12 of the input shaft 13 of the gearbox, which shaft is parallel with the axis of the crankshaft; and the usual clutch control fork 10a.

Keyed on the end of the crankshaft outside the case 8 of the clutch is a pulley 14 for driving the accessories (for example the fan and dynamo). 8a denotes the cover of case 8; this cover is removably fixed by screws or bolts 8b.

In the illustrated embodiment, the pulley 14 is main-

2 tained in position by a screw 15 screwed in a blind tapped hole in the crankshaft. Alternatively (FIG. 2), the pulley could be secured by a nut 16 screwed on a stud 17 at the end of the crankshaft.

The means securing the pulley could also provide a driving head 18 for starting up the motor by means of a crank.

In order to prevent the oil in the crank case from getting into the clutch case, an oil-sealed bearing 7 is interposed between pinion 11 and the wall separating both cases.

It is clear that the construction of this assembly is simplified and made cheaper owing to the fact that the crankshaft extends out of the case only at one end, namely the sole end which requires an oil-sealed bearing 7 in the vicinity of the clutch; access to the latter for repairs is very easy after having removed the pulley 14 and the cover 8a.

What is claimed is:

1. In a motor-gearbox unit, a case, a crankshaft having a first end portion extending out of said case and a second end portion at the opposite end of said crankshaft; a first oil-sealed bearing solid with said case and supporting said first end portion, a clutch arranged outside said case and comprising a driving element rigid with said first end portion and a driven element mounted for free rotation on said first end portion; a pulley fixed on said first end portion, beyond said clutch, and a second bearing arranged inside said case on a support solid with said case, said second bearing supporting said second end portion, said second end portion being thus housed entirely in said case, whereby said second bearing does not need to be oil-sealed.

2. In a motor-gearbox unit, a case, a crankshaft having a first end portion extending out of said case and a second end portion at the opposite end of said crankshaft; an input shaft of the gearbox parallel with the axis of said crankshaft and arranged inside said case, a first gear rigid with said input shaft, a second gear freely mounted on said first end portion and meshing with said first gear, a clutch arranged outside said case and comprising a driving element rigid with said first portion beyond said second gear and a driven element slidably mounted on said second gear to rotate therewith; a first bearing rigidly supported by said case and rotatably supporting said first end portion, and oil-tight means mounted in said case and tightly encompassing said second gear; a pulley fixed on said first end portion, beyond said clutch; and a second bearing arranged inside said case on a support solid with said case and supporting said second end portion, said second end portion being thus housed entirely in said case, whereby said second bearing does not need to be oil-sealed.

References Cited by the Examiner
UNITED STATES PATENTS
2,913,927  11/1959  Issigonis _____ 74—701

FOREIGN PATENTS
762,651  12/1956  Great Britain.
430,930  2/1948  Italy.
571,011  12/1957  Italy.

DAVID J. WILLIAMOWSKY, Primary Examiner.

DON A. WAITE, Examiner.

H. S. LAYTON, Assistant Examiner.